United States Patent
Guedalia et al.

(10) Patent No.: US 9,183,398 B2
(45) Date of Patent: Nov. 10, 2015

(54) CONTENT-DRIVEN SCREEN POLARIZATION WITH APPLICATION SESSIONS

(71) Applicants: Isaac David Guedalia, Bet Shemesh (IL); Ravinder P. Chandhok, San Diego, CA (US); Jacob Guedalia, San Diego, CA (US); Gaurav Sethi, San Diego, CA (US)

(72) Inventors: Isaac David Guedalia, Bet Shemesh (IL); Ravinder P. Chandhok, San Diego, CA (US); Jacob Guedalia, San Diego, CA (US); Gaurav Sethi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 68 days.

(21) Appl. No.: 13/623,746

(22) Filed: Sep. 20, 2012

(65) Prior Publication Data

US 2014/0082745 A1    Mar. 20, 2014

(51) Int. Cl.
| | |
|---|---|
| *G06F 21/60* | (2013.01) |
| *G06F 3/0481* | (2013.01) |
| *G06F 21/10* | (2013.01) |
| *G06F 21/84* | (2013.01) |

(52) U.S. Cl.
CPC .............. *G06F 21/60* (2013.01); *G06F 3/0481* (2013.01); *G06F 21/10* (2013.01); *G06F 21/84* (2013.01)

(58) Field of Classification Search
CPC ........ G06F 21/10; G06F 3/016; G06F 3/0481
USPC .................. 726/1, 2, 4, 7, 21, 26–28, 30, 34; 713/174, 193; 715/711
See application file for complete search history.

(56) References Cited

U.S. PATENT DOCUMENTS

| | | | |
|---|---|---|---|
| 5,493,692 A | 2/1996 | Theimer et al. | |
| 6,320,602 B1 * | 11/2001 | Burkardt et al. | 715/817 |
| 6,874,127 B2 * | 3/2005 | Newell et al. | 715/744 |
| 6,918,039 B1 * | 7/2005 | Hind et al. | 726/3 |
| 6,971,072 B1 * | 11/2005 | Stein | 715/866 |
| 7,516,477 B2 * | 4/2009 | Corby et al. | 726/1 |
| 7,694,148 B2 * | 4/2010 | Cheng et al. | 713/183 |
| 7,774,851 B2 | 8/2010 | Singh et al. | |
| 8,049,533 B1 * | 11/2011 | Lin | 326/82 |
| 8,136,051 B2 * | 3/2012 | Friedlander et al. | 715/830 |
| 8,166,181 B2 * | 4/2012 | Allen et al. | 709/227 |
| 8,281,045 B2 * | 10/2012 | Higuchi et al. | 710/8 |
| 8,352,870 B2 * | 1/2013 | Bailor et al. | 715/751 |
| 8,381,136 B2 * | 2/2013 | Morris | 715/864 |
| 8,441,369 B2 * | 5/2013 | Park et al. | 340/815.6 |
| 8,464,155 B2 * | 6/2013 | Militante et al. | 715/733 |
| 8,479,096 B2 * | 7/2013 | Terada et al. | 715/702 |

(Continued)

FOREIGN PATENT DOCUMENTS

EP    0622728 A1    11/1994

OTHER PUBLICATIONS

International Search Report and Written Opinion—PCT/US2013/060692—ISA/EPO—Jan. 8, 2014.

*Primary Examiner* — Kambiz Zand
*Assistant Examiner* — Tongoc Tran
(74) *Attorney, Agent, or Firm* — Muncy, Geissler, Olds & Lowe, P.C.

(57) ABSTRACT

The disclosure relates to rendering content on a display. An embodiment creates a plurality of sessions between the display and a content delineating device, determines, by the content delineating device, a sensitivity level of content, and renders content having a first sensitivity level in a first session and content having a second sensitivity level in a second session.

60 Claims, 4 Drawing Sheets

(56) References Cited

U.S. PATENT DOCUMENTS

| | | |
|---|---|---|
| 8,484,574 B2 * | 7/2013 | Burroughs et al. ............ 715/779 |
| 8,578,300 B2 * | 11/2013 | Relyea et al. ................. 715/848 |
| 2003/0006957 A1 * | 1/2003 | Colantonio et al. .......... 345/156 |
| 2004/0015729 A1 * | 1/2004 | Elms et al. .................... 713/201 |
| 2004/0193910 A1 | 9/2004 | Moles |
| 2005/0006154 A1 * | 1/2005 | Back et al. ........................ 178/1 |
| 2005/0086515 A1 * | 4/2005 | Paris ............................. 713/200 |
| 2005/0125673 A1 | 6/2005 | Cheng et al. |
| 2005/0132070 A1 * | 6/2005 | Redlich et al. ................ 709/228 |
| 2005/0219228 A1 * | 10/2005 | Alameh et al. ................ 345/173 |
| 2005/0243019 A1 * | 11/2005 | Fuller et al. .................... 345/1.3 |
| 2006/0279528 A1 * | 12/2006 | Schobben et al. ............ 345/156 |
| 2007/0282783 A1 | 12/2007 | Singh |
| 2008/0034435 A1 | 2/2008 | Grabarnik et al. |
| 2008/0052759 A1 | 2/2008 | Kronlund et al. |
| 2008/0316357 A1 | 12/2008 | Achari et al. |
| 2009/0254986 A1 | 10/2009 | Harris et al. |
| 2010/0124363 A1 | 5/2010 | Ek et al. |
| 2010/0275266 A1 | 10/2010 | Jakobson et al. |
| 2011/0145833 A1 * | 6/2011 | De Los Reyes et al. ...... 718/106 |

* cited by examiner

CONTENT-DRIVEN SCREEN POLARIZATION WITH APPLICATION SESSIONS

FIELD OF DISCLOSURE

The disclosure relates to rendering content on a display, and more particularly to rendering content on a display according to an associated sensitivity level.

BACKGROUND

An always-on display screen may display both private and non-private information. A user must take proactive steps to prevent others from seeing private information on the screen. For example, a user may tilt the screen away from others, dim the screen, reduce the font size, reduce the window size, move to a private area, use an externally mounted polarizing filter, etc., or simply not view private information when others are around.

An electronic reader is an example of an always-on device that displays private and non-private information. For example, certain electronic readers allow users to access their email (potentially private information), which can then be read by anyone that can view the screen.

Further, the content source of the information may not be aware of the privacy rules or capabilities of the display, or have any meaningful way to ensure that the user is viewing private information privately. As such, the source may have to prevent the private information from being displayed on certain types of devices.

There is needed a mechanism whereby an application can configure the display such that content is displayed appropriately.

SUMMARY

The disclosure relates to rendering content on a display. An embodiment creates a plurality of sessions between the display and a content delineating device, determines, by the content delineating device, a sensitivity level of content, and renders content having a first sensitivity level in a first session and content having a second sensitivity level in a second session.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the various embodiments are disclosed in the following description and related drawings. Alternate embodiments may be devised without departing from the scope of the invention. Additionally, well-known elements of the various embodiments will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the terms "embodiments" or "embodiments of the invention" do not require that all embodiments include the discussed feature, advantage or mode of operation.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the various embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An always-on display screen may display both private and non-private information. A user must take proactive steps to prevent others from seeing private information on the screen. For example, a user may tilt the screen away from others, dim the screen, reduce the font size, reduce the window size, move to a private area, use an externally mounted polarizing filter, etc., or simply not view private information when others are around.

An electronic reader is an example of an always-on device that displays private and non-private information. For example, certain electronic readers allow users to access their email (potentially private information), which can then be read by anyone that can view the screen.

Further, the content source of the information may not be aware of the privacy rules or capabilities of the display, or have any meaningful way to ensure that the user is viewing private information privately. As such, the source may have to prevent the private information from being displayed on certain types of devices.

The various embodiments provide a mechanism whereby an application can configure a display screen such that content is displayed appropriately. The application establishes one or more sessions with the display screen. Each session has an associated sensitivity level. The display is configured to display content in each session according to the sensitivity level for that session. The content is retrieved from the content source and displayed in the appropriate session. For example, a session associated with information displayed in the top section of the screen may require that section of the screen to be polarized or otherwise occluded or obscured in such a way as to make it visible only to those directly in front of the display, while a session associated with information displayed in the bottom section of the screen may permit that information to be visible to all.

An embodiment provides an application-driven hardware implementation for the display. The application is content-aware and display-aware, while the content source is neither. Accordingly, it is the application, not the user or the display screen or the content source, that enforces the privacy of the information. There are two key benefits to this arrangement. First, the hardware display screen is responsive to application logic. Second, the application logic creates sessions that are manifest on the hardware display screen but are not known to the content server.

The application can control the display screen and the display screen can provide feedback to the application, such as environmental information. Accordingly, the display screen need not be content-aware, or even aware of the source of the content.

Figure 1:
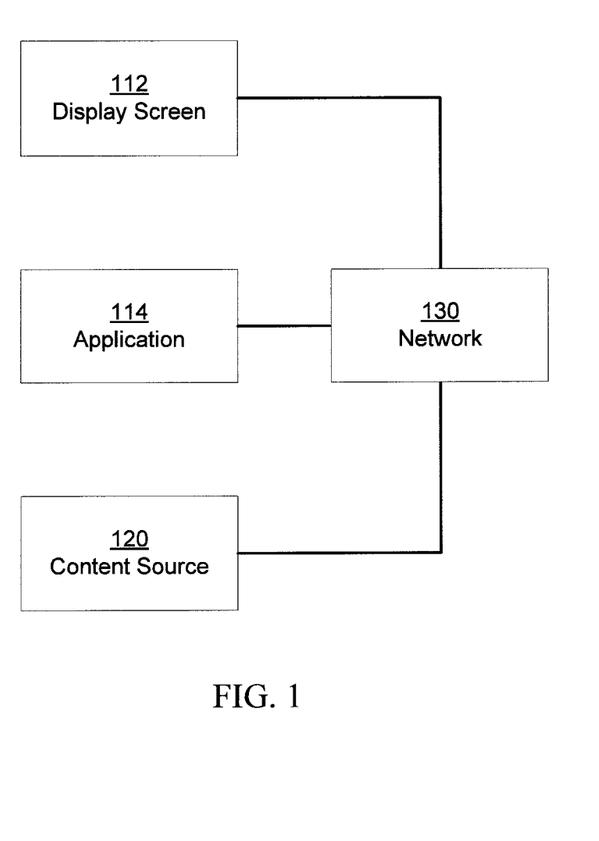
FIG. 1 illustrates an embodiment comprising a display screen, an application, a content source, and a network.

FIG. 1 illustrates an embodiment comprising a display screen 112, an application 114, a content source 120, and a network 130. The display screen 112, the application 114, and the content source 120 are separate entities. While a single device may comprise the display screen 112, the application 114, and the content source 120, alternatively, more than one separate devices may comprise the display screen 112, the application 114, and the content source 120. For example, one device may comprise the display screen 112 and the application 114, while another device may comprise the content source 120. As another example, one device may comprise the display screen 112 and the content source 120, while another device may comprises the application 114. As yet another example, one device may comprise the application 114 and the content source 120, while another device may comprise the display screen 112.

When embodied as a separate device, display screen 112 may be any user device with a display screen, such as a laptop, personal digital assistant (PDA), cellular telephone, desktop computer, tablet computer, etc. When embodied as a display screen on the same device as application 114 and/or content source 120, display screen 112 may be any display, such as a cathode ray tube (CRT) display, a liquid crystal display (LCD), a light emitting diode (LED) display, an intelligent display, a television (TV) screen, a computer screen, etc. In this disclosure, references to display screen 112 refer to either a separate device from or the same device as application 114 and/or content source 120, as appropriate.

When embodied on the same device as display screen 112 and/or content source 120, application 114 may be a software application or hardware component configured to implement the application functionality described herein. When embodied as a separate device, application 114 may be any user device or server comprising a software application or hardware component configured to implement the application functionality described herein. In this disclosure, references to application 114 refer to either a separate device from or the same device as display screen 112 and/or content source 120, as appropriate.

When embodied as a separate device from display screen 112 and/or application 114, content source 120 may be any remotely accessible source of content, such as an email server, a web server, a corporate database, an FTP server, etc. When embodied on the same device as display screen 112 and/or application 114, content source 120 may be any local internal or external storage, such as a hard drive, random access memory (RAM), flash memory, universal serial bus (USB) drive, secure digital (SD) card, etc. Further, content source 120 may refer to a single content source or multiple content sources. In this disclosure, references to content source 120 refer to either a separate device from or the same device as application 114 and/or display screen 112, as appropriate.

When embodied as a separate entity from display screen 112, application 114, and/or content source 120, network 130 may be any network for communicating with other devices, such as a cellular network, the Internet, a local area network (LAN), etc. When embodied in the same device as display screen 112, application 114, and/or content source 120, network 130 may be any network for communicating among the components and/or peripherals of a device, such as USB, FireWire, serial AT attachment (SATA), etc. Display screen 112, application 114, and content source 120 may be connected to network 130 via a wired connection or a wireless connection, such as WiFi, a cellular connection, etc.

Figure 2:
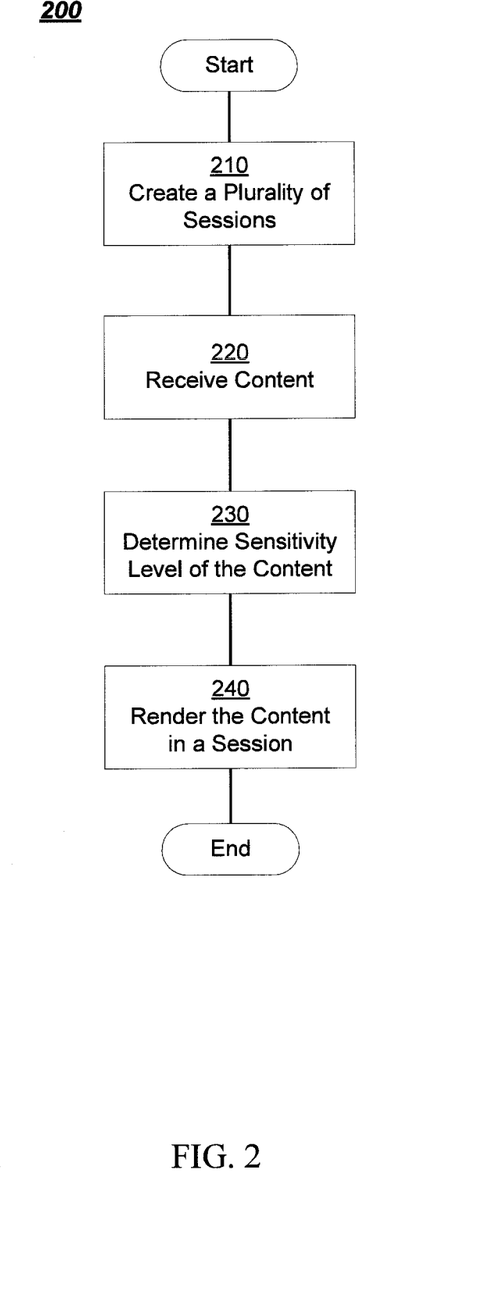
FIG. 2 is a flowchart of an exemplary flow for rendering content on a display screen.

FIG. 2 is a flowchart of an exemplary flow 200 for rendering content on a display screen. While FIG. 2 may be discussed with reference to a particular configuration of the display screen 112, the application 114, and the content source 120, i.e. as one device or separate devices, it is to be understood that the various embodiments discussed with reference to FIG. 2 are not so limited. Rather, the features of FIG. 2 are applicable to any configuration of the display screen 112, the application 114, and the content source 120.

At 210, application 114 creates a plurality of communication sessions with display screen 112. A given session may command all or a portion of display screen 112. There may be multiple active sessions commanding separate portions of screen 112 simultaneously, or each of multiple sessions may command screen 112 only when the corresponding content has been selected by the user, much like a window view of the content. One session may be established for sensitive content and another session for non-sensitive content. Alternatively, application 114 may establish a plurality of sessions for a plurality of sensitivity levels.

At 220, application 114 receives content from one or more content sources, such as content source 120. Features 210 and 220 do not need to be performed in order. Rather, they can occur in reverse order or even simultaneously. When content is received before application 114 creates the plurality of sessions, application 114 may create only those sessions needed to render the received content.

At 230, application 114 determines a sensitivity level of the received content. The sensitivity level may be a rating of how sensitive the content is. For example, the rating could be on a scale of 1 to 5, with 1 the least sensitive and 5 the most sensitive. Alternatively, the sensitivity rating could be binary, that is, either sensitive or not sensitive. In another alternative, the sensitivity rating could be one of sensitive, not sensitive, or unknown/undeterminable. There are many possible ways to rate the sensitivity level, and the various embodiments are not limited to any particular one.

In an embodiment, all content may have a default sensitivity level, then based on the determination made at 230, that sensitivity level may be increased or decreased. For example, in a 1 to 5 rating system the default sensitivity could be 2, in a binary rating it could be "not sensitive," and in a sensitive/not sensitive/unknown rating system it could be "unknown." Alternatively, received content may not have a default sensitivity level.

In an embodiment, the sensitivity level may be deduced from information and/or attributes about the content or the content source 120. For example, if content source 120 is an email server, a government computer, a secure server, a corporate database, etc., application 114 can assign a higher sensitivity level to the content. Likewise, if the content includes a confidentiality notice, a social security number, a monetary amount, a credit card number, or any other recognizably private information, application 114 can assign a higher sensitivity level to the content.

In an embodiment, the sensitivity level may be deduced from a history of the user's interactions with the screen 112 when viewing information from a given content source 120. For example, if a user always dims the screen 112 or reduces the font size when viewing information from the given content source 120, the application 114 can determine that information from that source should be given a higher sensitivity level.

In an embodiment, the sensitivity level may be deduced from explicit user preferences. The user may set preferences indicating that information from certain content sources should be given a higher sensitivity level. For example, the user may prefer that his or her email access and word processing be treated as sensitive, but that general web browsing need not be.

In an embodiment, the sensitivity level may be deduced from the environmental context of the screen 112. For example, when embodied as separate devices, the screen 112 and/or the application 114 may store one or more geo-fences indicating secure areas within which no security is necessary, but outside of which the content should be given a higher sensitivity level. When embodied as the same device, that device may store the geo-fence. Such a geo-fence may delineate the inside of an office building or certain floors of an office building as secure zones, and everything outside of those zones as unsecure areas. Accordingly, if the application 114 determines that the screen 112 is in an unsecure zone, it can assign a higher sensitivity level to the content. This can be useful where a government entity or corporation wishes to keep information viewable on a mobile device secure without having to prevent the user from leaving the premises with the device.

The application 114 and/or the screen 112 (if a separate device) may also track the location of screen 112 and record how the user interacts with it at various locations. For example, if the user always dims the screen 112 or reduces the font size when viewing content at certain locations, the application can assign a higher sensitivity level to the received content when the screen 112 is at those locations.

The screen 112 (or the device comprising display screen 112) may also determine whether anyone besides the user can see the screen 112, and if so, the application 114 can assign a higher sensitivity level to the content. Specifically, the screen 112 can record the scene with an integrated camera and perform facial recognition. If the screen 112 detects more than one face, it can relay that information to the application 114, which can then assign a higher sensitivity level to the content.

In an embodiment, the sensitivity level may be determined based on a set of rules. The rules may be automatically generated based on observations about location, history, preferences, etc., as described above, or manually entered by the user or a third party. For example, the application 114 may determine that whenever there are onlookers, the user always dims the screen 112. Thus, whenever the screen 112 informs the application 114 that there are onlookers, the application will assign a higher sensitivity level to any received content.

In an embodiment, a third party associated with content source 120, such as a server, may set the sensitivity level. The third party may send content to the application 114, and included with the content would be a preferred or mandatory sensitivity level. For example, a business could email a private document to its employees and the document would have an associated attribute indicating a mandatory sensitivity level for viewing the document. The attribute could be embedded in the document or pushed to the application 114 as a separate file.

In an embodiment, the application 114 may employ more than one of the above-described techniques when determining the sensitivity level of the received content. For example, a rule (or user preference, or third party setting) may specify that if the screen is (1) outside of a workplace geo-fence, or (2) outside of a certain radius of a given location, and (3) there are any onlookers, then (4) any work-related content should be assigned a higher sensitivity level.

In an embodiment, the user can manually override the sensitivity level, unless set and/or locked by a third party. For example, if the application 114 automatically gives the user's email a higher sensitivity level, the user may override that sensitivity level. Alternatively, if the application 114 does not give the user's email a higher sensitivity level, the user may assign it one manually. However, if the user receives a document from his or her employer and the employer has given it a higher sensitivity level, the user will not be able to change the sensitivity level.

The third party may set a preferred sensitivity level and/or a range of sensitivity levels for the content, in which case the user may be able to change the assigned sensitivity level from the preferred level to another level within the given range. The reason for permitting the user to change the sensitivity level of his or her own content, such as email, is because the content is the user's and it is therefore the user's concern as to who sees it. On the other hand, if a third party sets the sensitivity level, the third party should be able to distribute the content assured that the end user will not be able to change the sensitivity level and thereby defeat the point of assigning a sensitivity level to the content in the first place.

As discussed above, the sensitivity level may be assigned by a third party associated with the content source 120. Alternatively, upon receiving the content, the application 114 may query a third party to make a determination of the sensitivity level. The third party may be associated with the content source 120, such as a source of the content, or independent of the content source 120. The application 114 may transfer the content to the third party for analysis, or simply send relevant attributes of the content and the screen 112, such as those described above. In another alternative, the content may be sent to the third party first to be assigned a sensitivity level, then forwarded to the application 114. The screen 112 may periodically transmit relevant attributes about itself to the application 114 and/or the third party, such as location and onlookers, so that the device and/or server can better make the determination of sensitivity level.

A "higher" sensitivity level means higher than the default sensitivity level, if there is one, a sensitivity level of "sensitive" if the sensitivity rating is binary, an increase of the sensitivity rating where there are multiple levels of sensitivity, etc. The amount of the increase in sensitivity can be set by the user or a third party, or based on the content or content source. For example, the user's personal email may be given a sensitivity rating of 3 out of 5 while the user's corporate email may be given a sensitivity rating of 4 out of 5 and any documents received from the user's employer are given a sensitivity rating of 5 out of 5.

At 240, the application 114 renders the received content in the corresponding session. If the received content was assigned a higher sensitivity level, then the application 114 renders the content in the session that was established for sensitive content. If the received content was not assigned a higher sensitivity level, then the application 114 renders the content in the session that was established for non-sensitive content.

The session that was established for rendering sensitive content may cause the corresponding portion of the screen 112 to polarize or dim. Alternatively, the session may cause the screen 112 to display the sensitive content with a reduced font size, in a smaller window, or on a dark background. In another alternative, the session may simply present a warning that the content is sensitive, or it may block the content from being displayed altogether. There are many ways the screen 112 can make it more difficult for bystanders to view the content, and the various embodiments are not limited to any particular one.

In an embodiment, where there is more than one sensitivity level, there may be a matching session for each sensitivity level. For example, the session for a lower sensitivity level (e.g. level 3 out of 5) may simply polarize the corresponding portion of the screen 112. The session for a higher sensitivity level (e.g. level 4 out of 5) may polarize and dim the corresponding portion of the screen 112. The session for an even higher sensitivity level (e.g. level 5 out of 5) may polarize, dim, and reduce the font of the corresponding portion of the screen 112. Alternatively, the application 114 may establish communication sessions corresponding only to the received content.

In an embodiment, the sensitivity level of the content can change dynamically based on changes in the environmental context detected by the screen 112 (or the device comprising display screen 112). For example, if the sensitivity level is based on the location of the screen 112 or whether there are any onlookers and the location changes or the screen 112 detects an onlooker while the user is viewing the received content, the screen 112 relays this information to the application 114 and the application 114 can change the sensitivity level of the content and thereby the session with which it is associated and the way in which it is displayed on the screen 112. Likewise, if the location changes to a secure location or the screen 112 detects that onlookers are no longer present, the screen 112 can relay this information to the application 114 and the application 114 can change the sensitivity level of the content and thereby the session with which it is associated and the way in which it is displayed on the screen 112.

In an embodiment, the sensitivity level of the content can change dynamically based on a third party or the content source changing the sensitivity level after the content is received at 220. In response, the application 114 can change the sensitivity level of the content and thereby the session with which it is associated and the way in which it is displayed on the screen 112.

Because the sensitivity level can change dynamically, the session(s) associated with private content may refresh every few seconds, while the session(s) associated with the non-private content may only refresh every few minutes. That is, the screen 112 can check for, or the application 114 can push, updates to the sensitivity level in a matter of seconds. Alternatively or additionally, the screen 112 can check for, or the application 114 can push, updates to the content in the sensitive session(s) every few seconds.

In an embodiment, screen 112 may be a television and application 114 may be a remote control. The screen 112 may comprises two or more sessions controlled by one or more remote controls. Each of two or more users could have a remote control and control a session corresponding to their portion of screen 112 independently of the other users. A user could configure their session to be private, causing the screen 112 to, for example, polarize, dim, or blur that portion of the screen. In that way, the other users would not be able to clearly see the first user's portion of the screen 112.

As another example, if someone else enters the room or the viewing area of screen 112, the user could change the sensitivity level of the content, thereby causing the screen 112 to, for example, polarize, dim, or blur the user's portion of the screen.

As yet another example, the various sessions of screen 112 may be used to enforce parental controls. For instance, certain channels may be classified as sensitive and the associated user preference or rule for the session associated with the sensitive channel may be to black out the screen 112. Further, different remote controls may be associated with different children. Each child/remote may have its own list of sensitive channels that will be blacked out by the corresponding session.

Alternatively or additionally, a screen-within-a-screen feature may be classified as sensitive and thereby that portion of the screen 112 may be, for example, polarized, dimmed, or blurred.

Figure 3A:
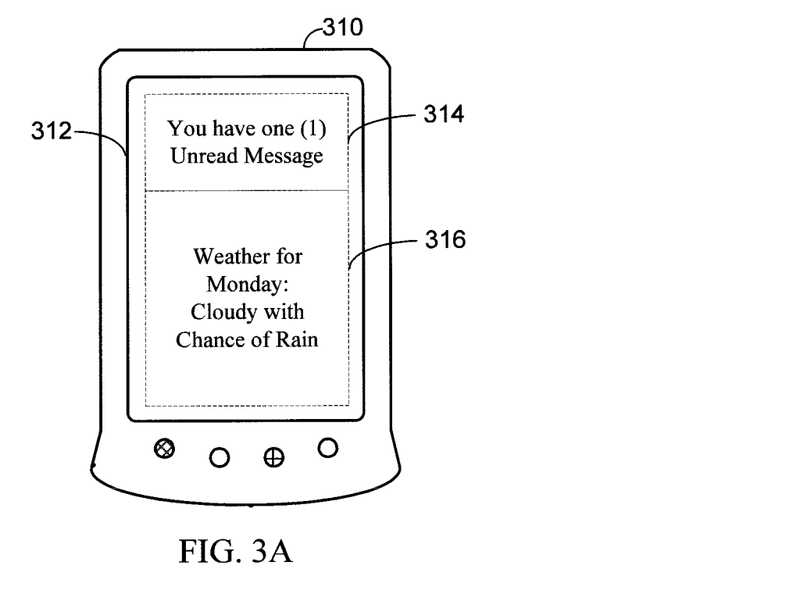
FIG. 3A illustrates a device according to an embodiment comprising a screen divided into two sessions.

FIG. 3A illustrates a device 310 comprising a screen 312 divided into two sessions, a private session 314 and a non-private session 316. Each session corresponds to a portion of screen 312. Screen 312 may have the capability to independently control various portions of itself. For example, screen 312 may polarize, dim, blur, reduce the font size, darken the background color, etc. of a portion of itself.

In the example of FIG. 3A, session 314 is a private session. As such, the portion of screen 312 corresponding to session 314 may be polarized or dimmed, the background color may be darkened, the font size or window size reduced, the content blurred, etc. Session 316, on the other hand, is not a private session. As such, the portion of screen 312 corresponding to session 316 is not altered to make it more difficult for bystanders to view.

Figure 3B:
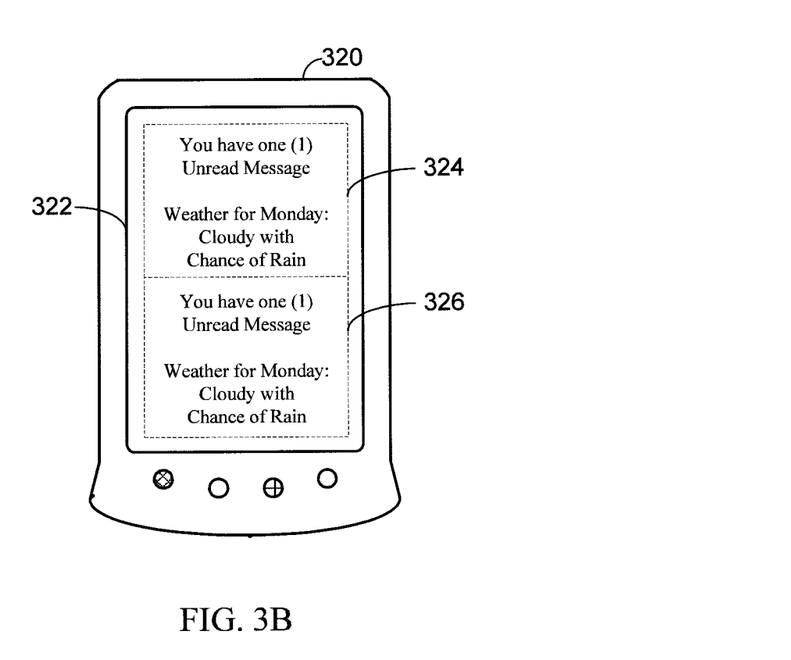
FIG. 3B illustrates a device according to an embodiment comprising a screen divided into two sessions.

In the example of FIG. 3A, sessions 314 and 316 display separate content from separate content source(s). FIG. 3B illustrates a device 320 comprising a screen 322 divided into two sessions, a private session 324 and a non-private session 326. Like FIG. 3A, each session corresponds to a portion of screen 322. Like screen 312, screen 322 has the capability to independently control various portions of itself. For example, screen 322 may polarize, dim, blur, reduce the font size, darken the background color, etc. of a portion of itself.

In the example of FIG. 3B, session 324 is a private session. As such, the portion of screen 322 corresponding to session 324 may be polarized or dimmed, the background color may be darkened, the font size or window size reduced, the content blurred, etc. Session 326, on the other hand, is not a private session. As such, the portion of screen 322 corresponding to session 326 is not altered to make it more difficult for bystanders to view.

In the example of FIG. 3B, sessions 324 and 326 display the same content from the same content source(s). This illustrates that the screen 322 can retrieve content from the same content source but in the first session it is private and in the second session it is public.

Figure 4:
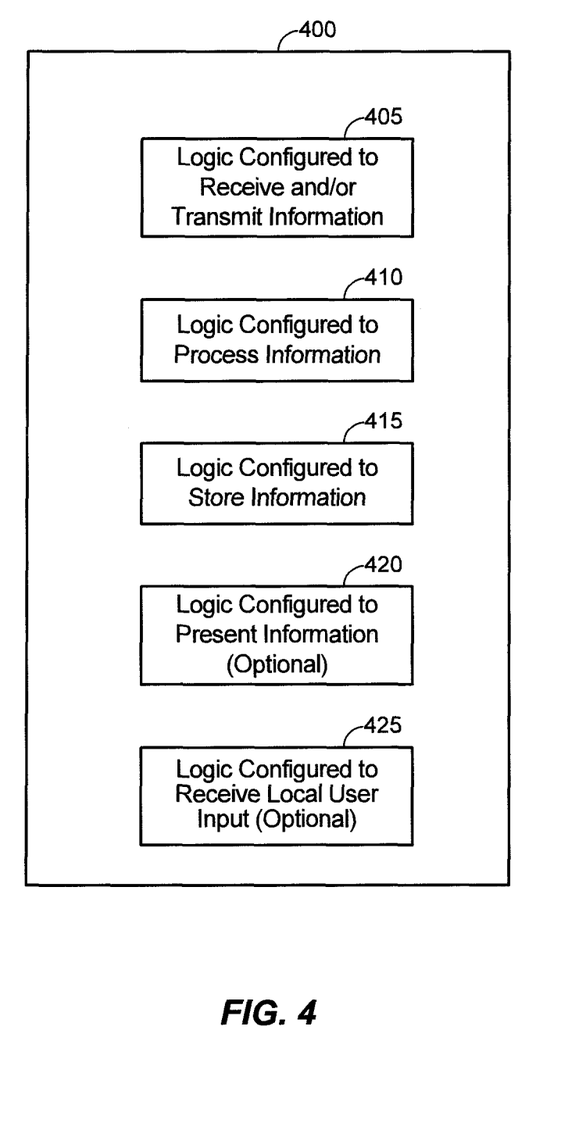
FIG. 4 illustrates a communication device that includes logic configured to perform functionality.

FIG. 4 illustrates a device 400 that includes logic configured to perform functionality. The device 400 can correspond to any of the above-noted communication devices, including but not limited to devices 110, 120, 130, and 140. Thus, device 400 can correspond to any electronic device that is configured to communicate with (or facilitate communication with) one or more other entities over a network.

Referring to FIG. 4, the device 400 includes logic configured to receive and/or transmit information 405. In an example, if the device 400 corresponds to a wireless communications device, the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet can be accessed, etc.). Thus, if the device 400 corresponds to some type of network-based server, the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to random access memory (RAM) memory, flash memory, read-only memory (ROM) memory, erasable programmable (EPROM), electrically erasable programmable ROM (EEPROM), registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the device 400 further optionally includes logic configured to present information 420. In an example, the logic configured to display information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the device 400 corresponds to device 110 as shown in FIG. 1, the logic configured to present information 420 can include the display 112. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the device 400 corresponds to device 110 as shown in FIG. 1, the logic configured to receive local user input 425 can include the display 112 (if implemented a touch-screen). In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 405. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method for rendering content on a display. Accordingly, the various embodiments are not limited to illustrated examples and any means for performing the functionality described herein are included in the various embodiments.

While the foregoing disclosure shows illustrative embodiments, it should be noted that various changes and modifications could be made herein without departing from the scope of the various embodiments as defined by the appended claims. The functions, steps and/or actions of the method claims in accordance with the various embodiments described herein need not be performed in any particular order. Furthermore, although elements of the embodiments may be described or claimed in the singular, the plural is contemplated unless limitation to the singular is explicitly stated.

What is claimed is:

1. A method of rendering content on a display, the method comprising:
    creating, by an application, a plurality of sessions between the display and a content delineating device;
    determining, by the application, first content to have a first sensitivity level and second content to have a second sensitivity level; and
    rendering the first content having the first sensitivity level in a first session of the plurality of sessions based on determining the first content to have the first sensitivity level and the second content having the second sensitivity level in a second session of the plurality of sessions based on determining the second content to have the second sensitivity level.

2. The method of claim 1, further comprising:
    receiving the first content and the second content from a content source at the content delineating device.

3. The method of claim 1, wherein the plurality of sessions correspond to a plurality of portions of the display.

4. The method of claim 1, wherein each of the plurality of sessions corresponds to a different sensitivity level of content.

5. The method of claim 1, wherein the determining comprises determining the first sensitivity level based on a source of the first content.

6. The method of claim 1, wherein the determining comprises determining the first sensitivity level based on information extracted from the first content.

7. The method of claim 1, wherein the determining comprises determining the first sensitivity level based on an environmental context of the display.

8. The method of claim 7, wherein the environmental context is one or more of a number of onlookers, a location of the display, and a history of user interaction with the display.

9. The method of claim 8, wherein the determining the first sensitivity level based on the environmental context of the display comprises:
    based on there being at least one onlooker, increasing the first sensitivity level of the first content.

10. The method of claim 8, wherein the determining the first sensitivity level based on the environmental context of the display comprises:

comparing the location of the display to the history of user interaction with the display; and based on a user of the display performing acts to obscure a view of the display at the location of the display, increasing the first sensitivity level of the first content.

11. The method of claim 8, wherein the determining the first sensitivity level based on the environmental context of the display comprises:

comparing the location of the display to a geo-fence; and based on the display being outside the geo-fence, increasing the first sensitivity level of the first content.

12. The method of claim 8, wherein the determining the first sensitivity level based on the environmental context of the display comprises:

based on the history of user interaction indicating that a user performs acts to obscure a view of the display when viewing content from a given content source, increasing a sensitivity level of content from the given content source.

13. The method of claim 8, wherein the determining the first sensitivity level based on the environmental context of the display comprises:

based on the history of user interaction indicating that a user performs acts to obscure a view of the display when viewing content containing certain information, increasing a sensitivity level of content containing the information.

14. The method of claim 7, wherein the first sensitivity level is dynamically changed based on a change in the environmental context.

15. The method of claim 1, wherein the determining comprises determining the first sensitivity level based on user preferences.

16. The method of claim 1, wherein the determining comprises determining the first sensitivity level based on learned rules.

17. The method of claim 1, wherein the content delineating device is coupled to a server that provides sensitivity level indicators.

18. The method of claim 17, wherein the sensitivity level indicators are fixed from the server.

19. The method of claim 17, further comprising:

adjusting the first sensitivity level based on the sensitivity level indicators from the server.

20. The method of claim 19, wherein the sensitivity level indicators from the server override the first sensitivity level determination of the content delineating device.

21. The method of claim 1, wherein the first content has a default sensitivity level.

22. The method of claim 1, wherein the first sensitivity level is a binary rating of sensitive or not sensitive.

23. The method of claim 1, wherein the first sensitivity level represents one of a plurality of degrees of sensitivity.

24. The method of claim 1, wherein the display renders content in the first session in an occluded manner and content in the second session in a non-occluded manner.

25. The method of claim 24, wherein the first session is dynamically changed from the occluded manner to a non-occluded manner based on an environmental context.

26. The method of claim 1, wherein the display is an intelligent display and the intelligent display is the content delineating device.

27. The method of claim 1, wherein the content delineating device is a processor coupled to the display.

28. The method of claim 1, wherein the content delineating device is a remote device from a device comprising the display.

29. The method of claim 1, wherein the content delineating device is an application installed on a device comprising the display.

30. An apparatus for rendering content on a display, comprising:

logic configured to create, by an application, a plurality of sessions between the display and a content delineating device;

logic configured to determine, by the application, first content to have a first sensitivity level and second content to have a second sensitivity level; and logic configured to render the first content having the first sensitivity level in a first session of the plurality of sessions based on determining the first content to have the first sensitivity level and the second content having the second sensitivity level in a second session of the plurality of sessions based on determining the second content to have the second sensitivity level.

31. The apparatus of claim 30, further comprising:

logic configured to receive the first content from a content source at the content delineating device.

32. The apparatus of claim 30, wherein the plurality of sessions correspond to a plurality of portions of the display.

33. The apparatus of claim 30, wherein each of the plurality of sessions corresponds to a different sensitivity level of content.

34. The apparatus of claim 30, wherein the logic configured to determine comprises logic configured to determine the first sensitivity level based on a source of the first content.

35. The apparatus of claim 30, wherein the logic configured to determine comprises logic configured to determine the first sensitivity level based on information extracted from the first content.

36. The apparatus of claim 30, wherein the logic configured to determine comprises logic configured to determine the first sensitivity level based on an environmental context of the display.

37. The apparatus of claim 36, wherein the environmental context is one or more of a number of onlookers, a location of the display, and a history of user interaction with the display.

38. The apparatus of claim 37, wherein the logic configured to determine the first sensitivity level based on the environmental context of the display comprises:

logic configured to increase, based on there being at least one onlooker, the first sensitivity level of the first content.

39. The apparatus of claim 37, wherein the logic configured to determine the first sensitivity level based on the environmental context of the display comprises:

logic configured to compare the location of the display to the history of user interaction with the display; and logic configured to increase, based on a user of the display performing acts to obscure a view of the display at the location of the display, the first sensitivity level of the first content.

40. The apparatus of claim 37, wherein the logic configured to determine the first sensitivity level based on the environmental context of the display comprises:

logic configured to compare the location of the display to a geo-fence; and logic configured to increase, based on the display being outside the geo-fence, the first sensitivity level of the first content.

41. The apparatus of claim 37, wherein the logic configured to determine the first sensitivity level based on the environmental context of the display comprises:

logic configured to increase, based on the history of user interaction indicating that a user performs acts to obscure a view of the display when viewing content from a given content source, a sensitivity level of content from the given content source.

42. The apparatus of claim 37, wherein the logic configured to determine the first sensitivity level based on the environmental context of the display comprises:
logic configured to increase, based on the history of user interaction indicating that a user performs acts to obscure a view of the display when viewing content containing certain information, a sensitivity level of content containing the information.

43. The apparatus of claim 36, wherein the first sensitivity level is dynamically changed based on a change in the environmental context.

44. The apparatus of claim 30, wherein the logic configured to determine comprises logic configured to determine the first sensitivity level based on user preferences.

45. The apparatus of claim 30, wherein the logic configured to determine comprises logic configured to determine the first sensitivity level based on learned rules.

46. The apparatus of claim 30, wherein the content delineating device is coupled to a server that provides sensitivity level indicators.

47. The apparatus of claim 46, wherein the sensitivity level indicators are fixed from the server.

48. The apparatus of claim 46, further comprising:
logic configured to adjust the first sensitivity level based on the sensitivity level indicators from the server.

49. The apparatus of claim 48, wherein the sensitivity level indicators from the server override the first sensitivity level determination of the content delineating device.

50. The apparatus of claim 30, wherein the first content has a default sensitivity level.

51. The apparatus of claim 30, wherein the first sensitivity level is a binary rating of sensitive or not sensitive.

52. The apparatus of claim 30, wherein the first sensitivity level represents one of a plurality of degrees of sensitivity.

53. The apparatus of claim 30, wherein the display is configured to render content in the first session in an occluded manner and content in the second session in a non-occluded manner.

54. The apparatus of claim 53, wherein the first session is dynamically changed from the occluded manner to a non-occluded manner based on an environmental context.

55. The apparatus of claim 30, wherein the display is an intelligent display and the intelligent display is the content delineating device.

56. The apparatus of claim 30, wherein the content delineating device is a processor coupled to the display.

57. The apparatus of claim 30, wherein the content delineating device is a remote device from a device comprising the display.

58. The apparatus of claim 30, wherein the content delineating device is an application installed on a device comprising the display.

59. An apparatus for rendering content on a display, comprising:
means for creating, by an application, a plurality of sessions between the display and a content delineating device;
means for determining, by the application, first content to have a first sensitivity level and second content to have a second sensitivity level; and
means for rendering the first content having the first sensitivity level in a first session of the plurality of sessions based on determining the first content to have the first sensitivity level and the second content having the second sensitivity level in a second session of the plurality of sessions based on determining the second content to have the second sensitivity level.

60. A non-transitory computer-readable medium for rendering content on a display, comprising:
at least one instruction to create, by an application, a plurality of sessions between the display and a content delineating device;
at least one instruction to determine, by the application, first content to have a first sensitivity level and second content to have a second sensitivity level; and
at least one instruction to render the first content having the first sensitivity level in a first session of the plurality of sessions based on determining the first content to have the first sensitivity level and the second content having the second sensitivity level in a second session of the plurality of sessions based on determining the second content to have the second sensitivity level.

* * * * *